United States Patent [19]

Slaney et al.

[11] Patent Number: 5,102,211
[45] Date of Patent: Apr. 7, 1992

[54] METHOD AND APPARATUS FOR CONNECTOR ASSEMBLY

[75] Inventors: Paul Slaney, Groton; Soren Grindersley, Shelton, both of Mass.

[73] Assignee: Optical Fibers Technologies, Inc., Billerica, Mass.

[21] Appl. No.: 492,933

[22] Filed: Mar. 13, 1990

Related U.S. Application Data

[63] Continuation-in-part of Ser. No. 467,915, Jan. 22, 1990, which is a continuation-in-part of Ser. No. 378,930, Jul. 12, 1989.

[51] Int. Cl.⁵ .............................................. G02B 6/36
[52] U.S. Cl. ................................................ 385/81
[58] Field of Search ............. 350/96.20, 96.21, 96.22; 269/86, 89

[56] References Cited

U.S. PATENT DOCUMENTS

| | | | |
|---|---|---|---|
| 4,834,488 | 5/1989 | Lee | 350/96.20 |
| 4,840,450 | 6/1989 | Jones et al. | 350/96.20 |
| 4,946,247 | 8/1990 | Muska et al. | 350/96.20 |
| 4,958,900 | 9/1990 | Oritz, Jr. | 350/96.20 |

*Primary Examiner*—William L. Sikes
*Assistant Examiner*—Phan T. Heartney
*Attorney, Agent, or Firm*—Lahive & Cockfield

[57] ABSTRACT

Apparatus and method for the assembly of an adhesiveless optical fiber termination applies a selected force characteristic over a selected displacement. The apparatus includes a holder element, a drive element, and a positioning element which directs the relative motion of the holder and drive elements. In operation, the holder element receives a partially assembled optical fiber termination including inner and outer portions and a compressive system. The drive element, guided by the positioning element, provides the force which presses the portions of the termination telescopically together. The telescoping of the two components compresses the compressive system into mechanical engagement with the optical fiber.

20 Claims, 8 Drawing Sheets

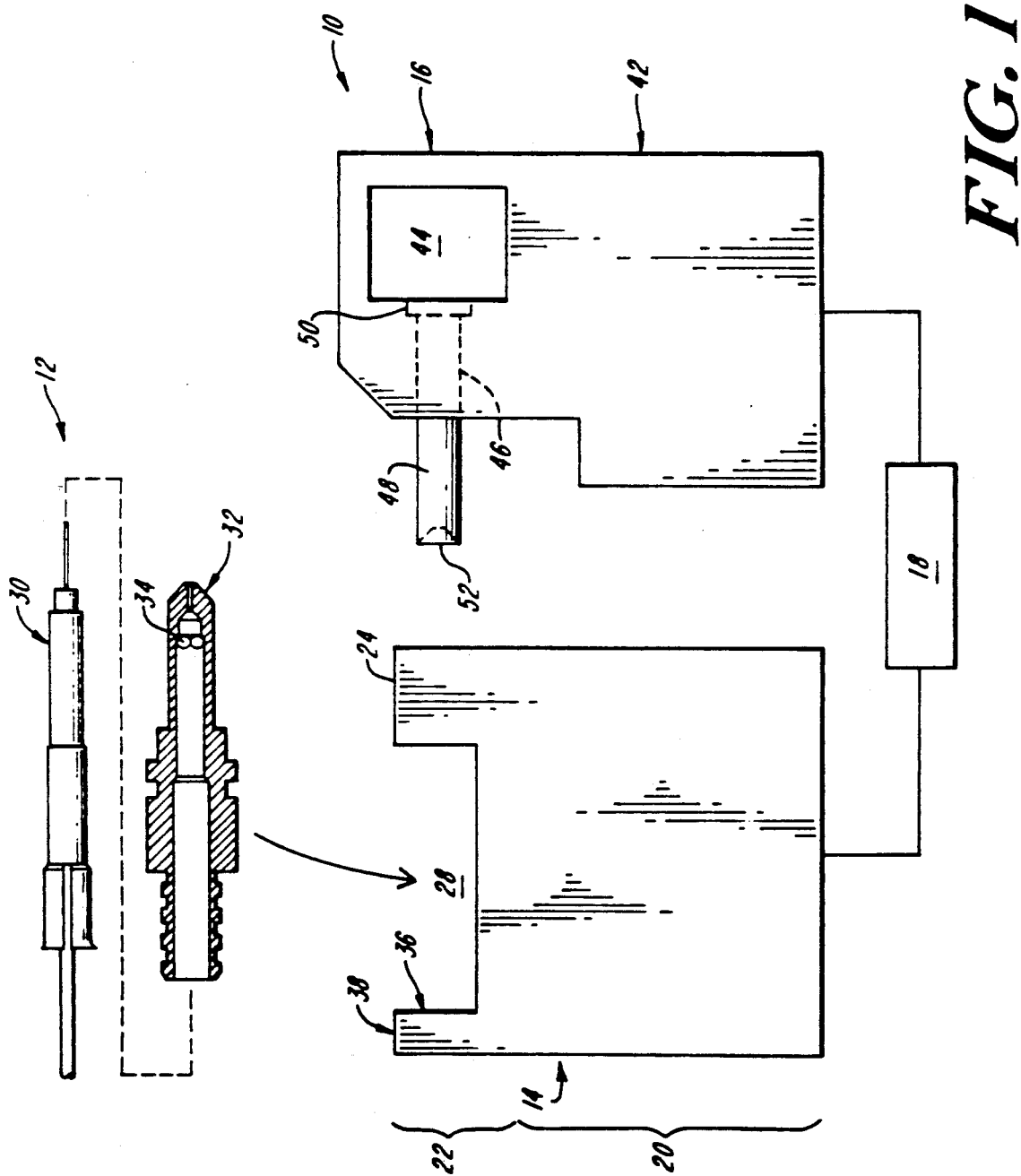

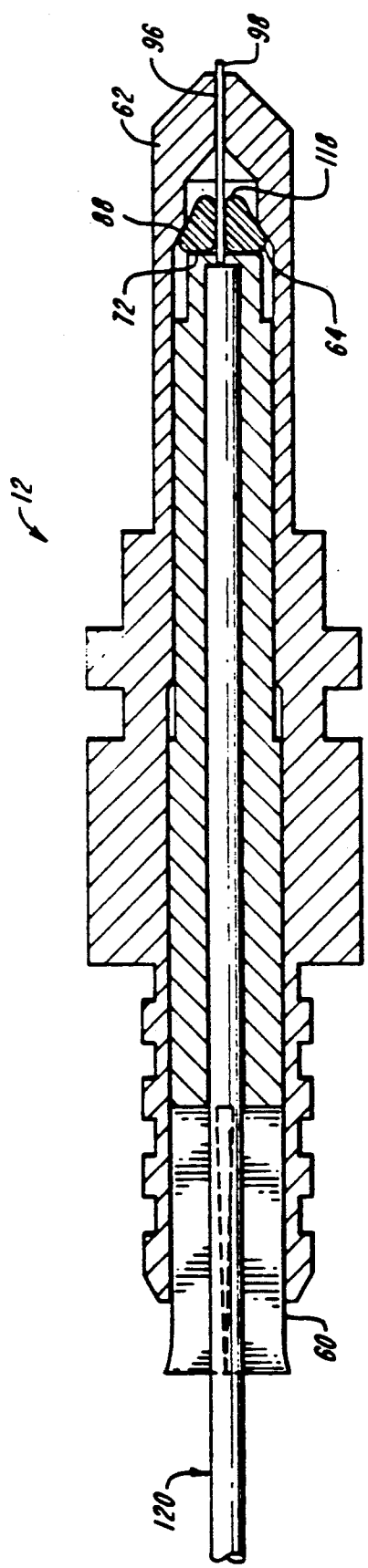
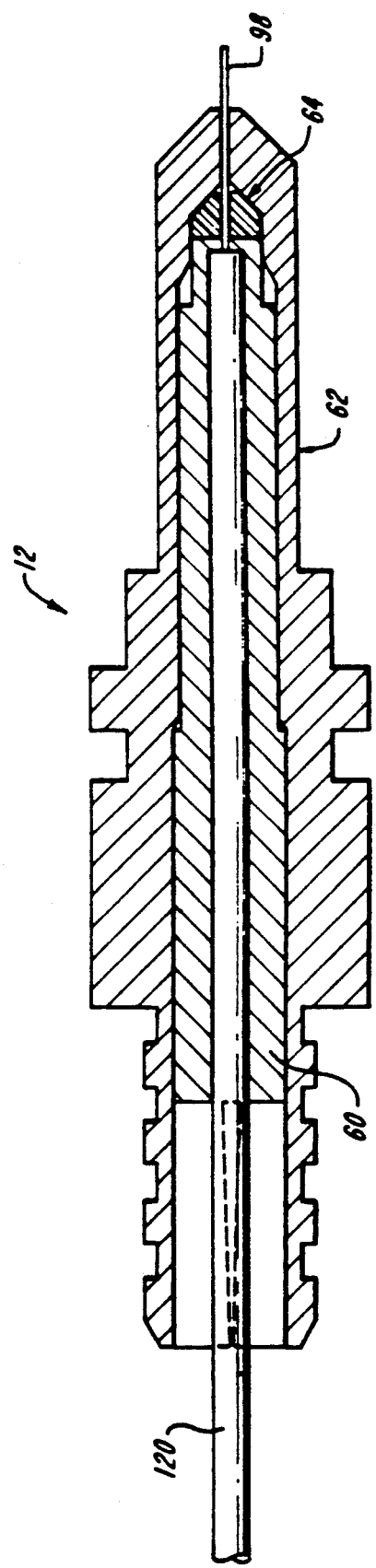
FIG. 2B
FIG. 2C

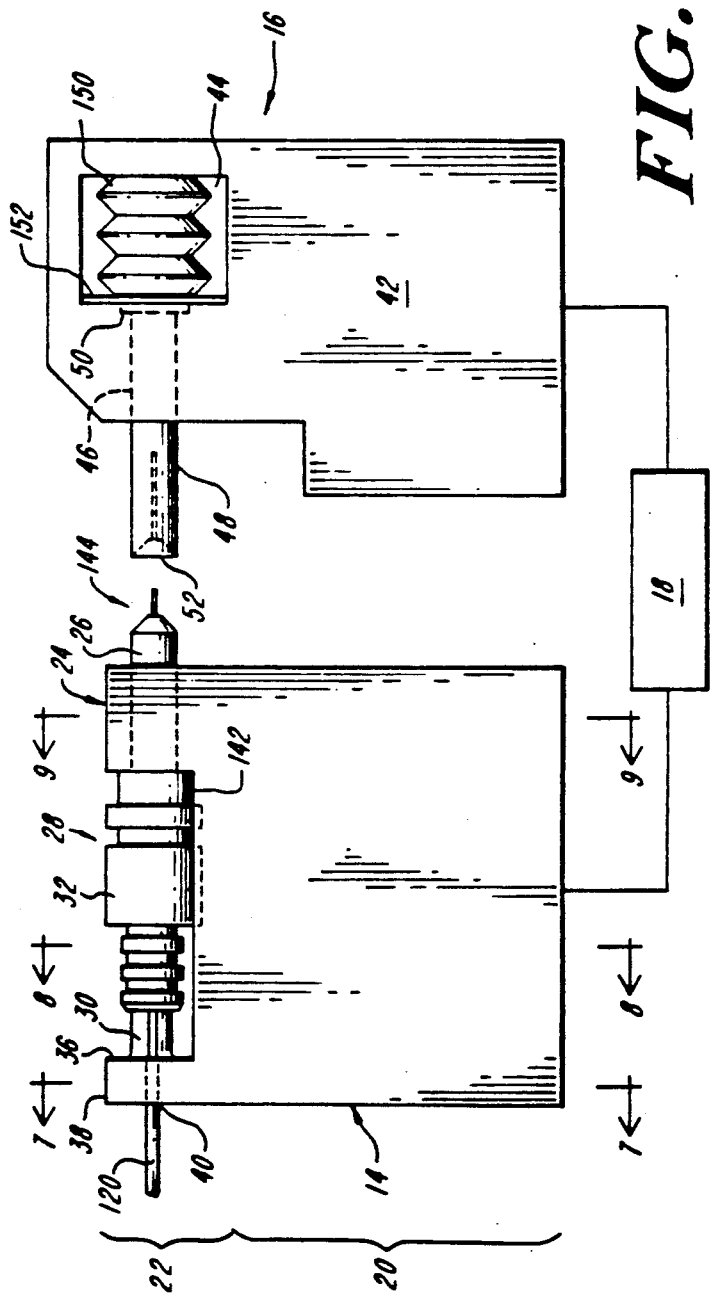

METHOD AND APPARATUS FOR CONNECTOR ASSEMBLY

REFERENCE TO RELATED APPLICATIONS

This application is a continuation-in-part of commonly-owned co-pending U.S. patent application Ser. No. 07/467,915 filed Jan. 22, 1990 for METHOD AND APPARATUS FOR TERMINATING A FIBER-OPTIC CABLE WITHOUT ADHESIVE, which is a continuation-in-part of commonly-owned co-pending U.S. patent application Ser. No. 07/378,930 filed July 12, 1989, for METHOD AND APPARATUS FOR TERMINATING A FIBER-OPTIC CABLE WITHOUT ADHESIVE.

The teachings of the above-cited patent applications are incorporated herein by reference.

BACKGROUND OF THE INVENTION

This invention relates to an apparatus and method for assembling telescopically interfitting workpieces. It relates in particular to an apparatus and method for assembling adhesiveless terminations for signal cables.

The need for apparatus capable of producing nondestructive forces for the assembly of terminations is acute in the field of fiber optic communication cables. In particular, the desired apparatus must be capable of assembling terminations for connecting segments of light-conductive cable with minimal detriment to the fiber and its light transmission efficiency. Further, the apparatus must be able to ensure satisfaction of the exceedingly demanding requirements of fiber alignment and spacing within the termination.

The cables used for fiber optic communications typically include at least one light transmitting, glass optical fiber clad in an optically insulating material. The cladding protects the glass fiber, and prevents dispersion of light out of the optical fiber. The fiber optic cable usually has a protective external buffer, typically of a plastic material, which may or may not be removed to terminate the cable. The minute, micron-size diameter of the optical fibers render them especially sensitive to the forces applied during assembly of cable terminations.

Numerous systems have been developed to deform or compress fiber termination assemblies to selected dimensions. Prior systems, however, may subject the termination and optical fiber to excessive compression or deformation pressures causing breakage or damage to the fiber and termination and, thus, reduced light transmission. Insufficient force, on the other hand, may result in incomplete assembly of the termination leading to undesirable movement of the optical fiber therewithin. These problems are typically cured by manufacturing both the termination and assembly tool to high tolerances. High tolerance manufacturing, however, raises the cost of both the termination and the tool often rendering them economically inappropriate for many uses.

It is accordingly an object of this invention to provide an improved method and apparatus for assembling a fiber optic cable termination by application of a selected force.

It is another object of the invention to provide a method and apparatus for assembling a fiber optic cable termination with minimal risk of subjecting the termination or cable to damaging or destructive forces.

It is also an object of the invention to provide a method and apparatus for assembling a fiber optic cable termination that is economical to manufacture, easy to use, and that provides a reliable, constant force characteristic.

Other general and specific objects of the invention will in part be obvious and will in part appear hereinafter.

SUMMARY OF THE INVENTION

The invention attains the foregoing objectives with an apparatus that includes a holder element, a drive element, and an element for maintaining the holder and the drive elements in selected disposition. The invention provides an apparatus and method for interfittingly assembling a first and a second workpiece by displacing them relative to each other along a path.

The holder element typically includes a jaw element for removably and replaceably holding a first workpiece in a selected alignment and position along a generally lineal path. The drive element is dimensioned to removably and replaceably engage a second workpiece after it has been partially assembled with the first workpiece held in the jaw element of the holder element. The drive element displaces the second workpiece relative to the first workpiece to interfittingly assemble the termination. Typically, a guide element is used to maintain the holder and drive elements in selected disposition and direct them along the desired path. Upon complete displacement, i.e., closure, of the holder and drive elements, the first workpiece is fully assembled with the second workpiece.

More particularly, the holder element includes a jaw element which removably and replaceably receives the first workpiece. Preferably, the jaw element includes a cradle portion into which the first workpiece can be positioned. This cradle portion also receives the second workpiece which is partially assembled with the first workpiece. A forward portion of the jaw element generally includes a guide slot for receiving the forward end of the second workpiece. The jaw element can also include a rear seating face arranged to removably and replaceably receive the first workpiece. A slot is typically lanced out of the rear seating face to permit the exit of the fiber or wire upon which the termination is being affixed.

The drive element, which is configured to removably and replaceably engage the second workpiece, includes a resiliently acting element arranged to provide a force of selected characteristic. The force characteristic provided by the drive element is used to displace the second workpiece along a selected path, preferably lineal, relative to the first workpiece. The force characteristic provided by the drive element is preferably constant and substantially equal to, if not slightly greater than, the resistance forces that may be produced as a result of the displacement of the second workpiece relative to the first workpiece. It is preferred that the force characteristic of the drive element be constant over a selected displacement. The drive element can be a compression spring. In one embodiment of the invention, the drive element further includes a plunger element having a jaw element which removably and replaceably engages the second workpiece. In another embodiment of the invention, the drive element includes both a plunger element which contacts the compression spring and an intermediate plunger element structured with a jaw element which removably and replaceably engages the second workpiece.

The element for maintaining the holder element and the drive element in selected disposition preferably is a guide element. Preferably, the guide element directs the holder and drive elements such they move along a generally lineal path. In one embodiment of the invention, the guide element includes a pair of oppositely disposed, parallel guide rails. In this embodiment, either the holder or drive element are held in a static position and the other element is slid over the rails as required for operation. In an alternative embodiment of the invention, the holder and drive elements may be pivoted relative to each other guided along a common axis.

According to the method of the invention, a first workpiece is removably and replaceably held by a jaw element with selected alignment and position along a path. A second workpiece, partially assembled with the first workpiece, is removably and replaceably engaged by a drive element. The second workpiece is then displaced relative to the first workpiece with a selected force. In one preferred embodiment this force is substantially constant over a selected displacement.

Preferably, the first and second workpieces define a continuous passage in which is seated a fiber optic cable. The fiber optic cable can be buffered or unbuffered. A portion of the fiber extending through the passage is substantially encircled by a compressive system located between the first and second workpieces. The compressive system can be deformed in a radially inward direction. The actuation of the drive element relative to the holder element results in the telescoping of the first and second workpieces. This telescoping causes the compressive system to compress into supporting and retaining engagement with the optical fiber.

The exposed, connecting end of an optical fiber that is secured in an assembled termination using the apparatus and method of the invention can be polished in the same manner as conventional in the art for terminations.

The foregoing features of the invention, and others described below, provide a highly reliable apparatus and method for assembling fiber optic cable terminations using a force having a constant characteristic. The invention can be practiced economically and hence cost competitively with existing practices and structures.

Although the invention thus provides a tool for affixing a termination to a fiber optic cable that is durable, precise and reliable, features of the apparatus and of the method of the invention may be used to advantage together with other fibers and wires, and the invention has corresponding scope.

DETAILED DESCRIPTION OF THE DRAWINGS

For a fuller understanding of the nature and objects of the invention, reference should be made to the following detailed description and the accompanying drawings, in which:

FIG. 1 is a side view of an apparatus for assembling optical fiber terminations according to the invention in which the optical fiber termination is shown unassembled cut-away form; FIG. 2A is a cut-away view of the optical fiber termination prior to insertion of the actuating element of the termination into the terminating element of termination; FIG. 2B is a view similar to FIG. 2A, with the actuating element partially assembled within the terminating element sufficiently to initially deform the compressive system;

FIGS. 3, 4 and 5 are perspective views of three different compressive systems useful in the optical fiber termination of FIG. 2;

FIG. 6 is a side view of an termination assembly apparatus according to the invention in the open position;

DESCRIPTION OF THE ILLUSTRATED EMBODIMENTS

Figure 2A:
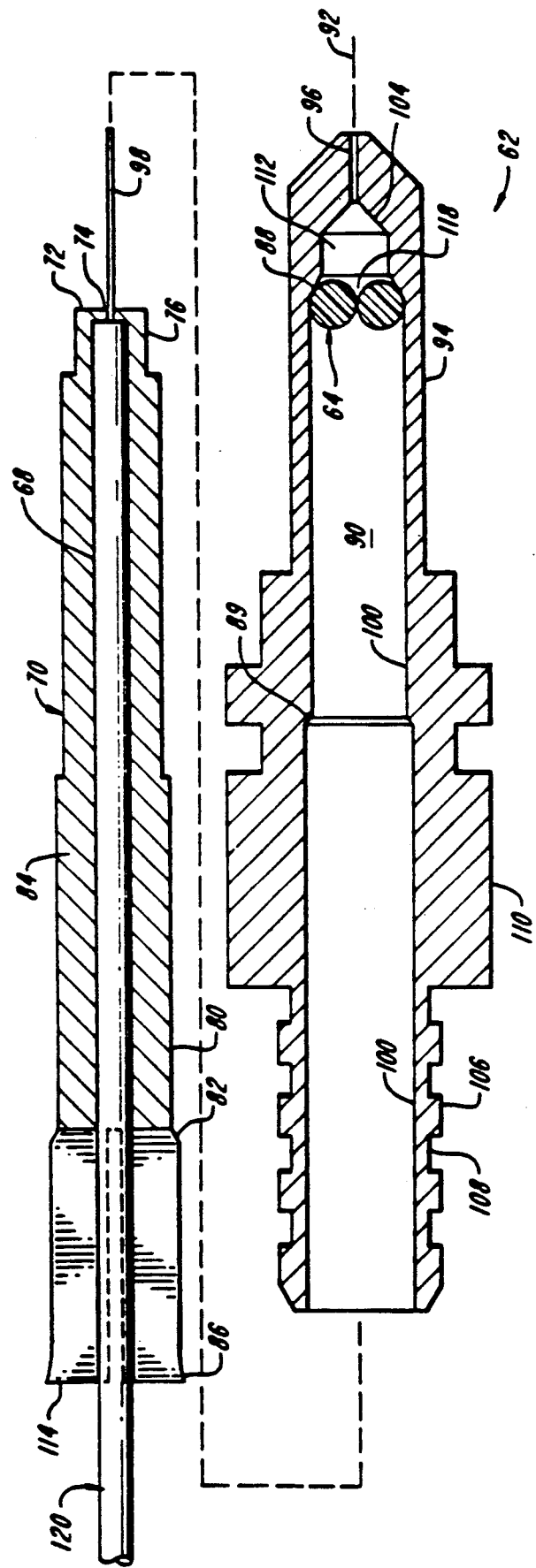
FIG. 2C is a side view similar to FIGS. 2A and 2B of the termination fully assembled.

A tool 10 for connector assembly according to the invention, shown in FIG. 1, has a holder element 14, a drive element 16, and an positioning element 18 for maintaining the holder element 14 and drive element 16 in selected disposition relative to a selected path. The tool 10 can be used to assemble a fiber optic termination 12.

Figure 9:
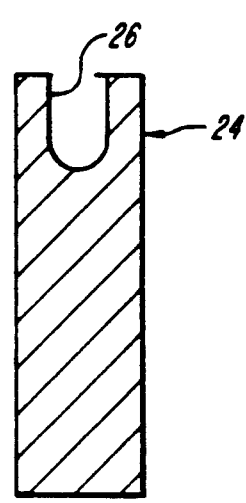
FIG. 9 is transverse cross-sectional view along line 9—9 of FIG. 6.

The illustrated holder element 14 includes a jaw element support 20 integral with a jaw element 22. The jaw element support 20 can be dimensioned as known to mount the jaw element 22 on a given platform. The jaw element 22 includes a forward alignment element 24 having a guide slot 26, shown in FIG. 9, which receives the forward portion of a second workpiece 32. A cavity 28 replaceably and removably receives the termination 12 having a first workpiece 30 and, partially assembled with the first workpiece 30, a second workpiece 32. A compressive system 34 is typically disposed, in a manner described in detail below, between the first workpiece 30 and the second workpiece 32. A rearward alignment guide 38 defines a fiber exit slot 40, shown in FIG. 7, and provides a rear seating face 36 for the first workpiece 30.

With further reference to FIG. 1, the drive element 16 can be mounted on a drive element support 42. Support 42 can be of conventional dimension and configuration to adapt the drive element 16 to a given platform. Typically, the drive element 16 includes an aperture 44 which houses a resilient element (not shown) for producing the desired force characteristic. Continuous with the aperture 44 is an axially extending tubular passage 46 which receives an axially extending plunger element 48. The end of the passage 46 adjacent to the aperture can be flared or stepped to accommodate a outwardly extending flange 50 on the plunger element 48. The plunger element 48 communicates the force characteristic provided by the resilient element to the second workpiece 32. The plunger element 48 can include a jaw element 52 for removably and replaceably receiving the second workpiece 32.

The positioning element 18 can be any alignment system familiar to those skilled in the art. Exemplary positioning elements 18 include oppositely disposed guide rails. In this embodiment, one of either the holder element 14 or drive element 16 is held static and the other element is directed into contact therewith as directed by the guide rails. Alternatively, the positioning element 18 can be a pivot arranged to actuate the holder element 14 and drive element 16 along a common axis. Typical of the latter configuration are hand tools structured similar to, for example, pliers. Numerical control systems employing computer subsystems can also be employed to control the relative movement of the holder element 14 and drive element 16.

The fiber optic termination 12, shown in detail in FIGS. 2A, 2B, and 2C has an inner, actuating element 60, corresponding to the first workpiece 30, an outer, terminating element 62, corresponding to the second workpiece 32, and a compressive system 64 illustrated as having a set of three compressive elements 66. It is recognized, however, that the correspondence between elements 60 and 62 and workpieces 30 and 32, respectively, can be reversed.

The illustrated inner, actuating element 60 has an tubular axial through passage 68 concentrically within a outer surface 70, and has a compressively acting axially forward surface 72. The passage 68 is adapted to receive and support a buffered optical fiber cable 84. The passage 68 extends the full length of the actuating element 60 except for a cylindrical lip 74 projecting radially inward from the cylindrical bore at the exit end, i.e., at the end adjacent to the forward surface 72. The lip 74 provides a circular abutment that the fiber cladding abuts for positioning purposes when the fiber is fully assembled within the inner element 60.

The illustrated tubular outer surface 70 has a front section 76, a larger middle section 78, and a still larger back section 80. The section 80 has an enlarged outer diameter, axially rearward of the a step 82, illustrated as about three-quarters of the way back from the forward surface 72 to the back, i.e., the left end of the inner element 60. The section 80 also preferably includes a rearwardly located tapered flare 86.

In one illustrative termination, the radial step 82 is in the order of one to a few thousands of an inch and the radial flare 86 is slightly larger, i.e., in the order of five thousandths of an inch. Preferably, the radial steps between the sections 76 and 78, and further between the sections 78 and 80, are located in the fully assembled termination, shown in FIG. 2C, in close axial rearward proximity of a guide surface 88 and a step 89, respectively, of the outer element 62. Outer surface 70 can also include a locking ring groove (not shown), located rearward of the step between sections 78 and 80, that seats an expandable locking ring (not shown).

The illustrated termination 12, which engages a fiber optic cable with the compressive system 64 at the forward end of the termination, i.e. right-most in FIG. 2A, also engages the cable at its rearward end, i.e. left-most in FIG. 2A. This second engagement is provided by clamping members 114, at the rear end of the inner, actuating element 60. These clamping members are actuated by interferingly engaging the walls of passage 90. The illustrated clamping members 114 are formed from a portion of rearmost section 80 on the inner element 60 including flares 86. Axial slots through the tubular wall of the largest diameter section 80 of the inner element 60, as shown in FIGS. 2A, 2B, and 2C, form four clamping fingers 114 in the embodiment shown. The enlarged outer diameter of these fingers interferingly fits within the passage 90, to compress the fingers onto the buffered cable as the termination is assembled.

The illustrated outer element 62 is a tubular housing body that has an axial through passage 90 concentric about an axis 92 with a forward outer surface 94. The tubular passage 90 has a first section 96, illustrated as dimensioned for receiving and for supporting and positioning an unbuffered optical fiber 98. The first passage section is axially forward of a second passage section 100. This rear passage section 100 is dimensioned to telescopically receive and seat the inner element 60. A radial constriction forms a shoulder or abutment 104 at the back, rear end of the forward passage section 96 and forward of the passage section 100. The illustrated radial constriction is a right circular cone concentric with the axis 92 of the passage 90. The outer surface of the terminating element body is illustrated as having an axial succession of lands 106 and grooves 108 at the axial back end to receive and engage a cable-supporting sheath or sleeve, as conventional. The forward outer surface 94 is structured as a cylindrical plug to seat telescopically in conventional fashion in a mating receptacle termination (not shown), and the central portion 110 of the outer surface is structured to provide conventional mechanical connection with such a receptacle.

The illustrated second passage section 100 has, spaced apart in axial succession, a conical deflecting guide surface 88, an outward step 89, and, in some embodiments, a locking groove (not shown), all rearward of the radial constriction element 104. The illustrated passage 90 also has a short bore 112 between the elements 104 and 88. The guide surface 88 forms a funnel, preferably with a cone angle in the order of 60 degrees, and having a forward diameter less than the composite diameter of compressive system 64 prior to being compressed. If employed, the locking groove is positioned to receive and seat the locking ring carried on the inner element 60, when the termination 12 is completely assembled.

The compressive system 64 of the termination 12 can include a single, centrally apertured deformable element such as the spherical element 116' of FIG. 4 or as the disk element 116" of FIG. 5. The termination 12 of FIGS. 2A through 2C employs a set of three spherical elements 116 arranged in a circle to define a fiber-receiving hole 118 between them. In other embodiments, the compressive system 64 can include three rod-like elements 116''' as shown in FIG. 3.

To ensure that each compressive element 117 maintains substantially uniform holding pressure on an optical fiber or cable, each is preferably constructed of a homogeneous and resiliently pliable, elastomeric material that retains the memory of its undeformed shape. Examples of such a material include nylon, delrin, polyethylene, polypropylene, rubber, and polyvinyl chloride. The initial shape of the elements 116 may be of various configurations per FIGS. 2A through 2C, 3, 4, and 5, and, preferably, has a circular cross-section, as shown.

The fiber passage 118, passing through or among element(s) 116 receives an unbuffered optical fiber 98, as FIG. 2A shows. Prior to compression, the fiber passage 118 has a diameter sufficient to allow free movement of the optical fiber. The size and shape of the fiber passage 118 may be altered by varying the number, diameter, and/or shape of the elements 116. Further, the compressive system 64 preferably has a tapered opening to the passage 118 to guide insertion and passage of the optical fiber. A system 116 of three spheres provides such a fiber guide, as shown in FIGS. 2A. If a one-piece compressive system 116 as in FIGS. 4 or 5 is used, it is preferred that the ends of the fiber passage 118 therein be flared to guide the optical fiber as also shown.

FIGS. 2A through 2C illustrate, in sequence, the process whereby the termination 12 engages and supports the optical fiber 84. As shown in FIG. 2A, a buffered fiber optic cable 84 is seated within the passage 68 of the inner element 60, and the unbuffered and clad optical fiber 98 of the cable, extends beyond the compressively acting surface 72 of the inner element 60. The compressive system 64 is assembled with the cable 120, as by sliding it over the fiber 98 prior to assembly with the outer terminating element 62. An alternative step to place the compressive system 64 within passage 90 of the outer, terminating element 62 at the forward end of the second passage section 100.

The inner element 60 is slidingly telescoped into outer the element 62, as shown in FIG. 2B, with the unbuffered optical fiber 98 passing through the clearance hole 118 and through the forward passage section 96 of outer element 62, to project axially beyond the termination element 12. After the termination elements 60 and 62 are partially assembled and aligned with each other and with the cable 120, further axial assembly of the inner element 60 with the outer element 62, includes compressing the compressive system 64 between the compressively acting surface 72 of inner element 60 and the guide surface 88 of the outer element 62. The guide surface 88 deflects the axial force exerted by compressively acting face 72 causing the compressive system 64 to deform radially inwardly and into initial mechanical engagement with the optical fiber 98.

Further assembly of the two termination elements, shown in FIG. 2C, presses the compressive system 64 axially into the bore 112, with continued compression radially inward onto the fiber 98. The inner and outer elements 60 and 62 thus function like a piston within a cylinder respectively, and compress the set of elements of the compressive system onto the fiber 98.

Concurrently, the greater diameter of inner element 60 rearward of step 82 produces a compressive engagement between section 80 of inner element 60 and the outer element 62, and deflects the fingers 114 concentrically inward onto cable 120.

The inner element 12 telescopes into the outer element 14 until the rear face of clamping members 114 are substantially aligned with the rear edge of the outer element 62. Alternatively, in embodiments of the termination using a system of locking grooves and rings, the elements are telescoped until the locking grooves are aligned, at which point the locking ring expands and engages the surfaces of the grooves. At either point, the assembled compressive system 64 mechanically engages the unbuffered optical fiber 98, for supporting and retaining the fiber 98 in a fixed position relative the outer surface of outer element 62. The passage 90 within the forward section 96 supportingly receives with minimal clearance the optical fiber tip that projects forward of the compressive system to align and position it with precision. Further, the compressively acting clamping fingers 114 secure the buffered clad optical cable 120 to the assembled termination elements 60 and 62.

The projecting optical fiber 98 is trimmed and polished, as known in the art, to complete the termination of the cable 120.

As also known in the art, a sleeve (not shown) may be positioned over the buffered optical cable 120, after final assembly of the termination 12, such that a portion extends over the lands 106 and grooves 108 of the outer, terminating element 62 and over the jacket of the optical fiber cable 120. The sleeve may then be crimped or otherwise secured in position.

It will now be apparent that the assembly procedure requires only axial telescoping of the elements 60 and 62 together, and requires no threading or rotating of one element relative to the other or relative to the optical fiber. The only force or stress to which the exposed fiber 98 is thus subjected is radial compression by the compressive system 64.

Figure 10:
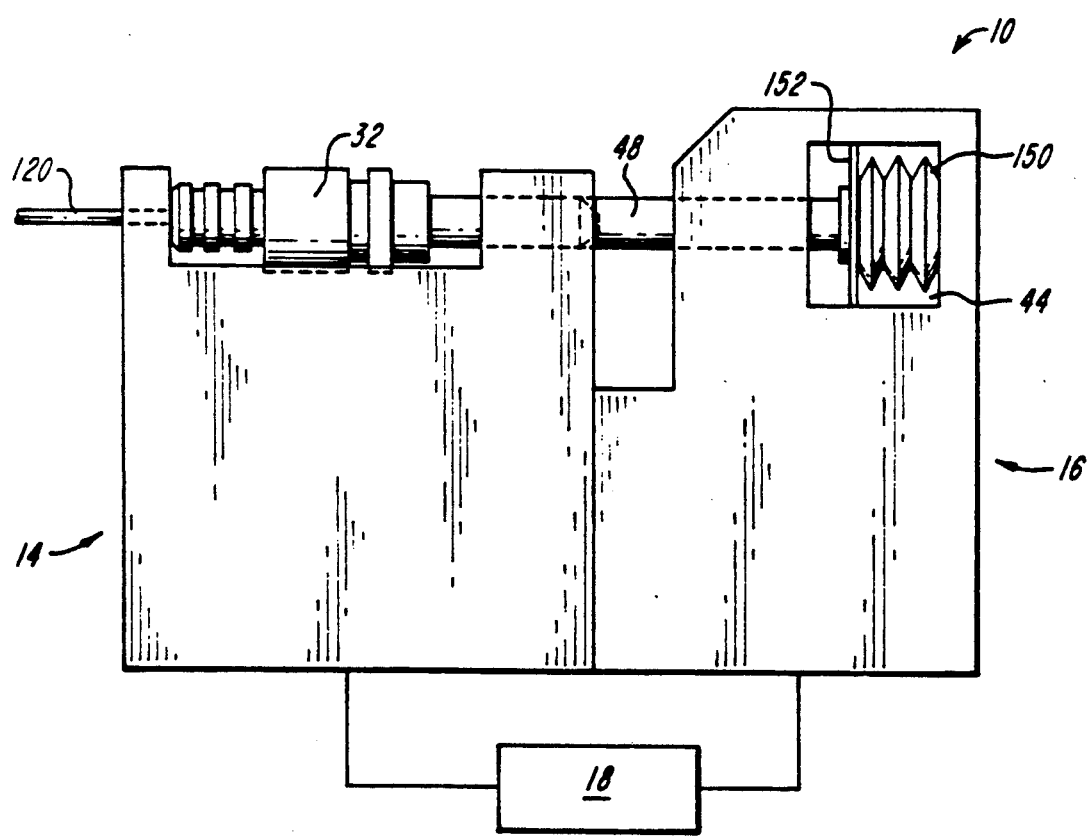
FIG. 10 is a side view of the termination assembly apparatus shown FIG. 6 in the closed position.

FIGS. 6 and 10 illustrate one embodiment of the assembly tool 10 in accordance with the invention and having a termination 12 disposed in a jaw element 22 of an holder element 14. The relative movements of the holder element 14 and the drive element 16 are controlled by the previously described positioning element 18.

The jaw element 22 includes the forward alignment guide 24, rear alignment guide 38, and cradle element 142 which together define the cavity 28 for receiving the first workpiece 30 and, partially assembled with the first workpiece 30, the second workpiece 32. The forward alignment guide 24 includes a guide slot 26. The guide slot 26, shown in detail in FIG. 9, has a generally oblong shape and an end opening onto the upper surface of the jaw element 22. The guide slot 26 is arranged to support the forward portion of the second workpiece 32 prior to engagement by the plunger element 48 of the drive element 16. After engagement, the guide slot 26 directs the plunger element 48 along a lineal path which is coaxial with an axis 144 of the workpieces.

Figure 8:
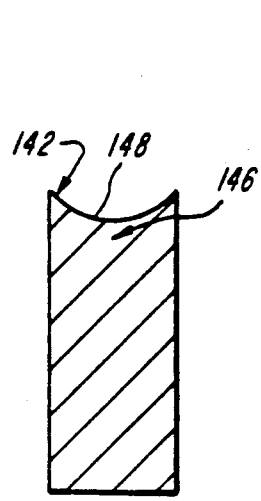
FIG. 8 is a transverse cross-sectional view along line 8—8 of FIG. 6.

The cradle element 142, detailed in FIG. 8, can include a base portion 148 having a planar central region and axially disposed, flared edges 146. The base 148 can be exclusively planar. Alternatively, the base portion 148 can have an arcuate configuration of radius substantially equal to the radius of the second workpiece 32, i.e., the outer element 62 of the termination 12. The flared edge, or arcuate, configuration of the base portion 148, provides a substantially complementary seat for the second workpiece 32. The complementary configurations of the cradle element 142 and the outer structure of the second workpiece 32 prevent detrimental longitudinal movement of the termination 12 during the assembly process.

Figure 7:
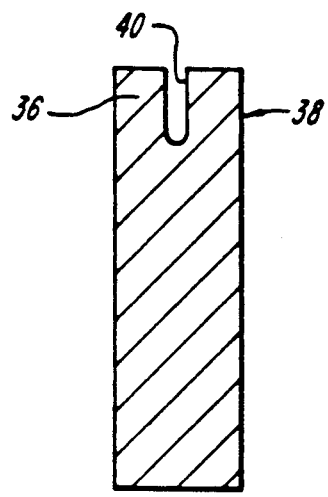
FIG. 7 is a transverse cross-sectional view along line 7—7 of FIG. 6.

The rearward alignment guide 38, shown in FIG. 7, provides a rear seating face 36 which receives the rearward face of the first workpiece 30. To ensure that the force characteristic produced by the drive element 16 concentrically and coaxially telescopes the workpieces without buckling of the termination 12, the rear seating face is arranged at an angle of about 90 degree relative to the workpieces' axis 144. The rearward alignment guide 38 further includes a fiber exit slot 40 to accommodate the cable 120 extending from the workpieces 30 and 32. The fiber exit slot 40 can be oblong or "V"-shaped in design and has an end opening onto an upper surface of the jaw element 22.

The drive element 16 of FIGS. 6 and 10 broadly includes a resilient element 150 for producing a selected force characteristic, i.e., a selected force to distance ratio, and a plunger element 48 for communicating the force characteristic to the workpieces.

In the presently preferred embodiment of the invention, the resilient element 150 is a compression spring, in particular a disc spring. To use the tool 10 in conjunction with the presently preferred termination 12, described in FIGS. 2A through 2C, the illustrated resilient element 150 produces a constant force characteristic of 150 pounds over a travel distance 0.030 inches. A single disc spring, or sets of springs stacked in parallel or series, can be used. Those skilled in the art will recognize that by stacking disc springs in parallel, the force of the discs add; by stacking the discs in series the total travel distance of the discs add. The illustrated preferred disc spring has a ratio of no load height to disc thickness of between about 1.4 and about 1.6. In particular, the preferred disc spring has a ratio of 1.5 and dimensions of 18 millimeters O.D. ×6.2 millimeters I.D. ×0.4 millimeters Height. The force characteristic of the preferred disc at 75% and 100% deflection is 31 pounds; the total travel of the preferred disc from 75% to 100% deflection is 0.0059 inches.

The requisite force and travel distance for a termination can be determined empirically. Preferably, the force produced is sufficient to assemble the termination 12 against a resistance force which is a function of the displacement of the first workpiece 30 relative to a second workpiece 32. A resilient element 150 having the preferred force characteristic over the requisite travel distance, for use in the present embodiment of the invention, can be prepared by: (1) stacking five of the preferred disc springs in parallel; (2) assembling five of the spring stacks in series, and; (3) compressing the unit to 60% of total deflection and placing it into the aperture of 44 of drive element 16. Compression to 60% of total deflection permits a small travel distance before the constant force characteristic is achieved, thus permitting a jaw element 52 of the plunger element 48 to engage the second workpiece 32 under decreased force.

Although the resilient element 150 has been defined using compression, or disc, springs, those skilled in the art will recognize that other electro-mechanical, pneumatic, or hydraulic systems capable of providing the requisite constant force characteristic can be substituted.

The plunger element 48, which communicates the force characteristic produced by the resilient element 150, typically includes a jaw element 52, which removably and replaceably engage the forward portion of the second workpiece 32, and a flange 50, to prevent excess forward axial movement of the plunger element 48 upon rebound of resilient element 150 at the end of an assembly sequence. The plunger element 48 is typically connected to a plate 152 which provides a seat for the above-described spring unit.

Figure 11:
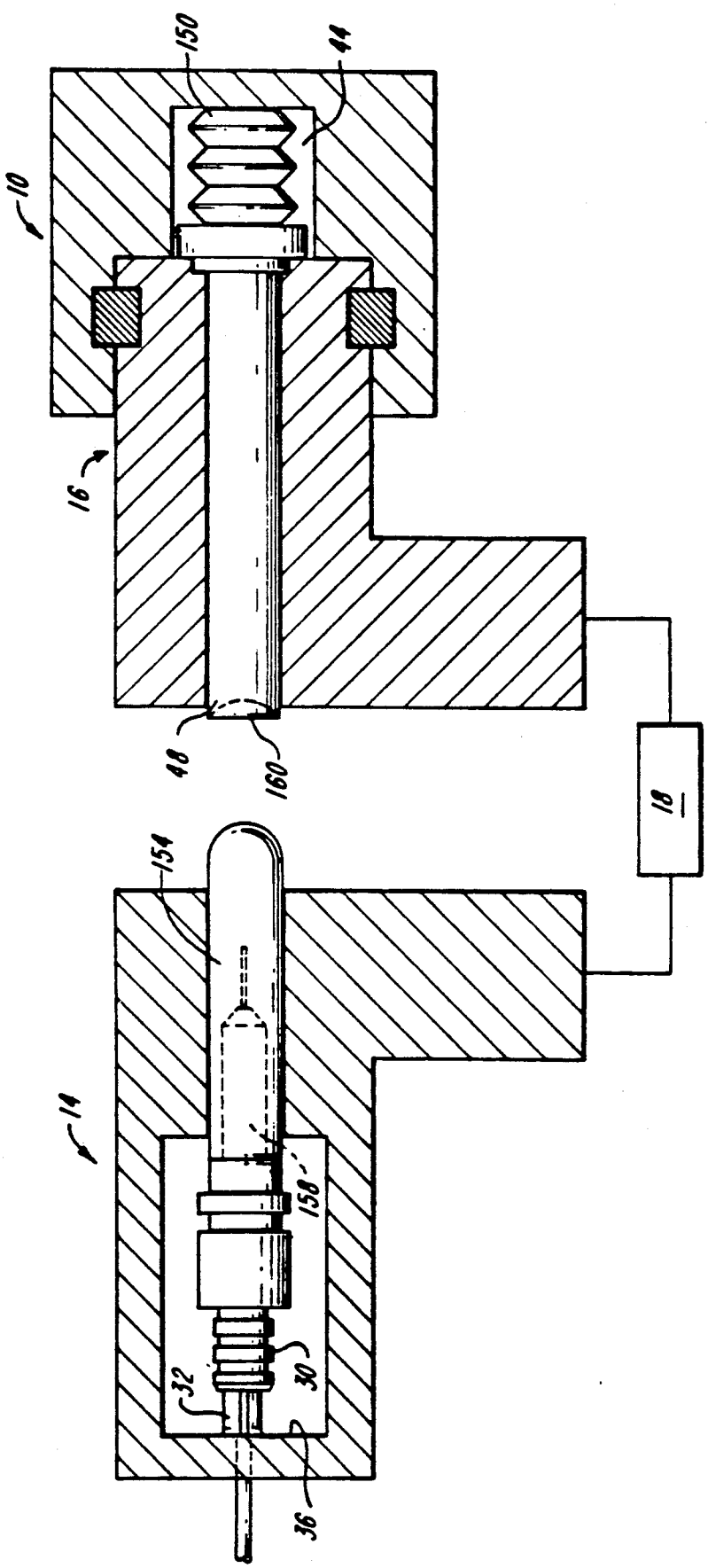
FIG. 11 is a side view, partially cut away, of another termination assembly apparatus, in the open position, according to the invention.
Figure 12:
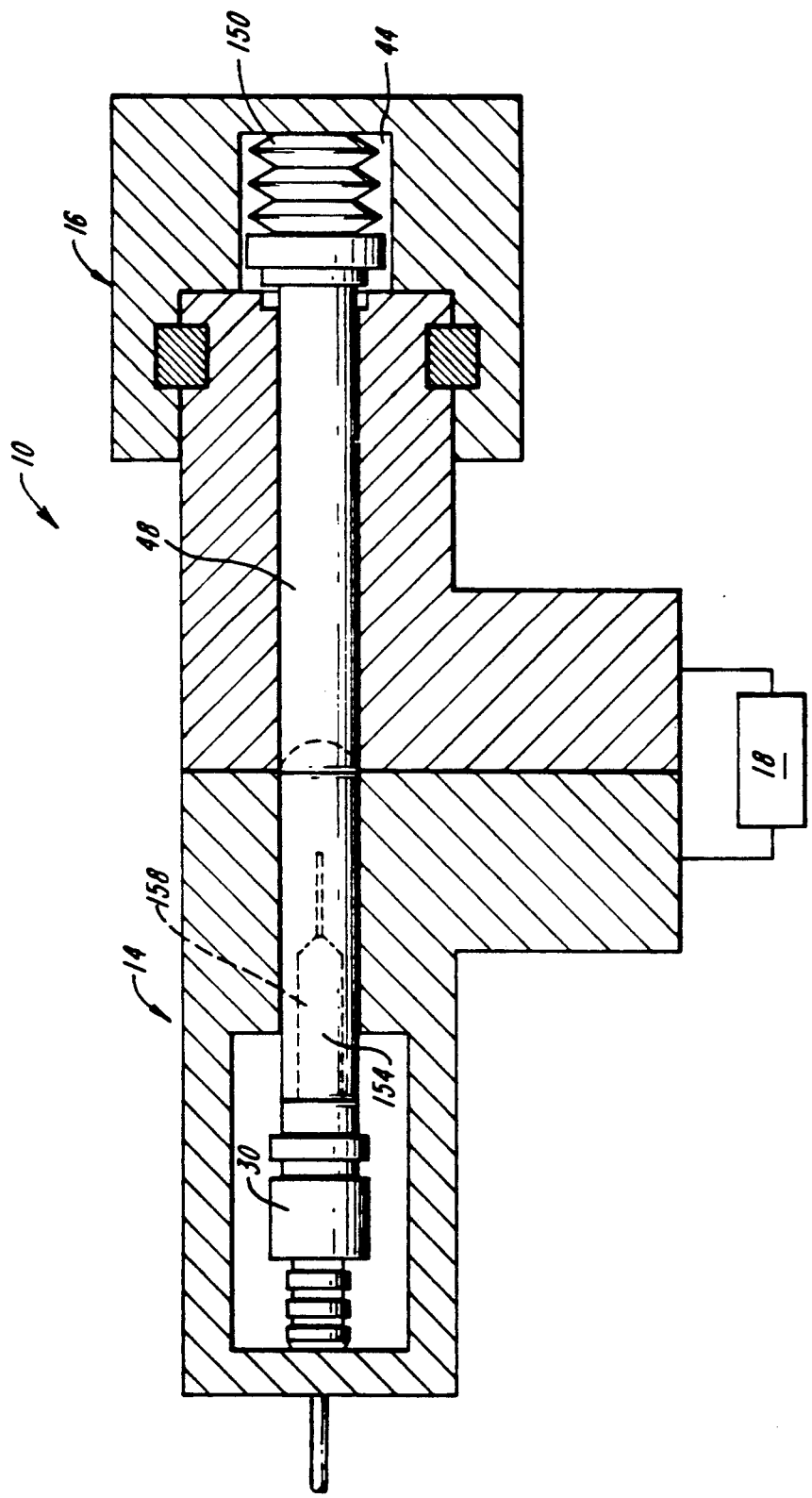
FIG. 12 is a side view, partially cut away, of the termination assembly apparatus shown in FIG. 11, in the closed position.

FIGS. 11 and 12 show another tool 10' according to the invention for assembling terminations 12 including the components described above with reference to FIGS. 6 and 10, except that the plunger element 48' does not engage the second workpiece 32' and the elements 14' and 16' of the tool 10' are configured to pivot about a common axis. Further, the embodiment of FIGS. 11 and 12 does not include a forward alignment element. An intermediate plunger element 154 engages the second workpiece 32' and communicates the force characteristic produced by resilient element 150' thereto. To permit the elements 14' and 16' to be pivotable about an axis, a first end of the intermediate plunger element 154 is preferably machined to a hemispherical shape. The hemispherical shape permits continuous and tangential engagement between the flat surface 160 of the plunger element 48' and the intermediate plunger element 154. A second end of the intermediate plunger element 154 includes the jaw element 158 which permits the intermediate plunger element 154 to engage the second workpiece 30'. The remaining structure and its function for this embodiment of the invention can be in accord with the preceding description of FIGS. 6 and 10.

Figure 13:
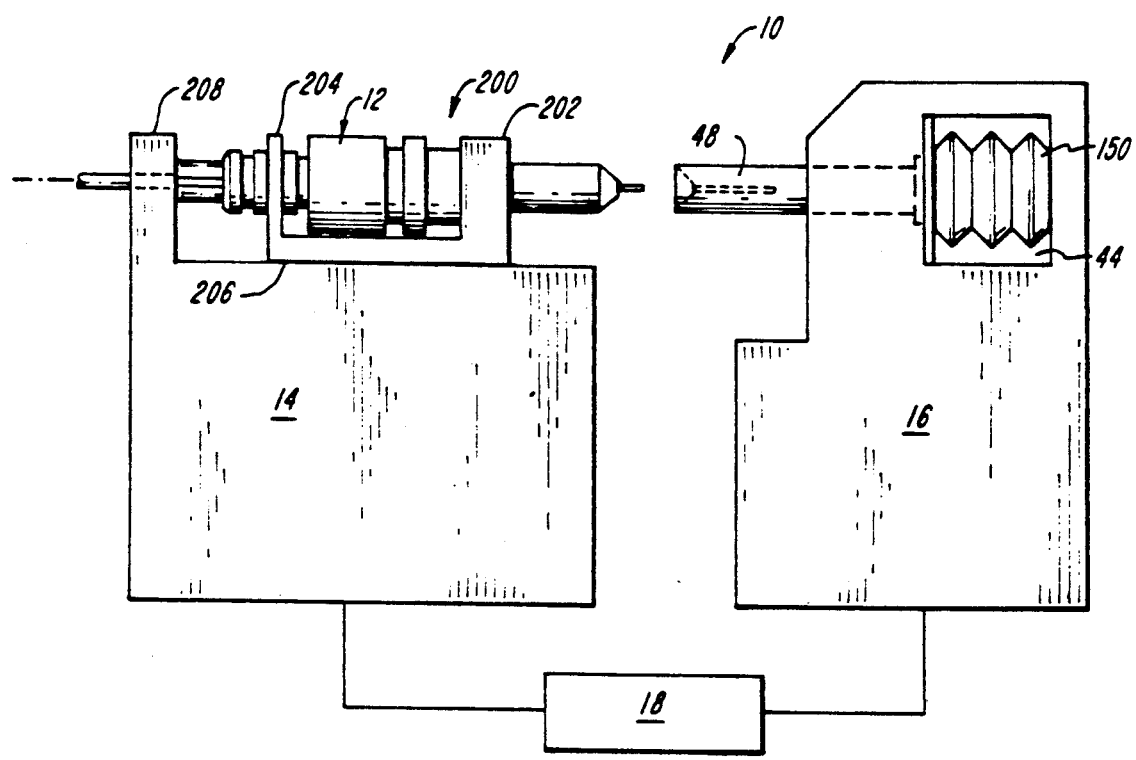
FIG. 13 is a side view, of another embodiment of the termination assembly apparatus of the present invention in the open position.
Figure 14:
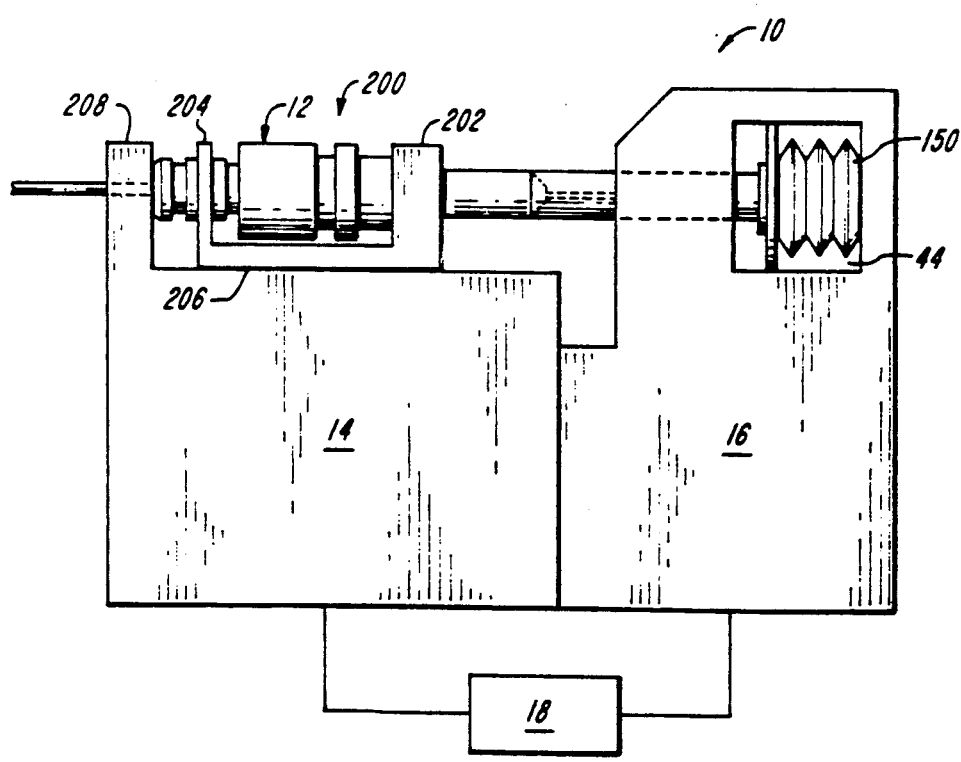
FIG. 14 is a side view of the termination assembly apparatus shown in FIG. 13 in the closed position.

FIGS. 13 and 14 illustrate another embodiment of the tool 10" including the components described above in connection with FIGS. 6 and 10 except that a sliding support 200 is configured to receive the termination 12. The support includes a forward alignment element 202, rearward second workpiece support 204, and a base 206. The slidably mounted support 200 provides increased control over the longitudinal movement of the second workpiece 32", as well as permitting more efficient compression of the first workpiece 30" with the second workpiece 32". A rear alignment guide 208 continues to provide a rear seating face which receives the rear face of the first workpiece 30". The remaining structure and its function for this embodiment of the invention can be in accord with the preceding description of FIGS. 6 and 10.

FIGS. 6 and 10, and 11 and 12, illustrate the process of the invention, as practiced using the above-described embodiments of the apparatus of the invention, with a termination 12 including a first workpiece 30 and a second workpiece 32. As shown in FIGS. 6 and 11, a first workpiece 30, assembled with a second workpiece 32, is removably and replaceably held in the holder element 14. The relative positions of the first and second workpieces 30, 32 is similar to that shown and described in connection with FIG. 2A. To telescope the workpieces without buckling, the first workpiece 30 and second workpiece 32 are selectively aligned and positioned along a path which is coaxial with a longitudinal axis of the plunger element 48.

In the next step, the jaw elements 52 and 158, of the plunger element 48 and the intermediate plunger element 154, respectively, engage the second workpiece 32. Initial contact between the second workpiece 32 and the jaw elements 52 and 158 also pushes the first workpiece into abutting contact with the rearward seating face 36. After this initial contact, the termination 12 is substantially in the condition shown in FIG. 2B.

Displacement of the second workpiece 23 relative to the first workpiece 30 over a selected distance continues using the constant force provided by the resilient element 150. The application of the selected constant force continues until the termination is completely assembled in the manner shown and described in connection FIG. 2C.

Post-assembly processing of the termination 122 includes clipping and polishing the fiber. A typical post-assembly processing method is disclosed in OPTICAL CABLE TERMINATION PROCEDURES published by the assignee of the present invention and incorporated herein by reference. As described therein, the fiber is clipped by scribing the exposed Projecting fiber and pulling the fiber along its axis to sever it. The forward end of the termination element, with clipped fiber extending therefrom, typically is then inserted into a polishing disk and passed over an abrasive film, e.g., one formed of aluminum oxide, to polish the fiber facet. As also known in the art, the end of the termination element, and hence the fiber facet, can be made optically flat, or given a selective radius, by selection of the proper polishing disk.

It will thus be seen that the invention efficiently attains the objects set forth above. In particular, the invention provides an apparatus for the assembly of adhesiveless optical fiber cable terminations. This apparatus and the method of the invention can provide a constant force characteristic capable of mechanically secured terminations to optical fibers, without damaging the light transmissive path.

It will be understood that changes may be made in the above constructions and in the foregoing steps and sequences of operation without departing from the scope of the invention. It is accordingly intended that all matter contained in the above description or shown in the accompanying drawings be interpreted as illustrative rather than in a limiting sense.

Having described the invention, what is claimed as new and secured by Letters Patent is:

1. Apparatus for assembling first and second workpieces that interfit with relative displacement along a path, said apparatus comprising
   A. holder means for removeably and replaceably holding said first workpiece with selected alignment and in a selected position along said path,
   B. drive means for removably and replaceably engaging a second workpiece that is partially telescopically assembled with the first workpiece that is held in said holder means, and for displacing said second workpiece along said path relative to said first workpiece for telescopically interfitting assembly therefore, and
   C. means for maintaining said holder means and said driving means in selected disposition relative to said path.

2. Apparatus according to claim 1 wherein said driving means includes a resiliently acting element arranged for providing a force of selected characteristic for displacing said second workpiece.

3. Apparatus according to claim 2 wherein said resiliently acting element is arranged for providing a force of constant characteristic.

4. Apparatus according to claim 3 wherein said force has a constant characteristic over a selected displacement.

5. Apparatus according to claim 1 wherein said driving means comprises a compression spring.

6. Apparatus according to claim 1 wherein
   A. said holder means comprises a first jaw means for removably and replaceably receiving said first workpiece, and
   B. said driving means comprises a second jaw means for removably and replaceably engaging second workpiece and means for displacing said second jaw means along said path with a force of selected characteristic.

7. Apparatus according to claim 6 wherein said means for displacing said second jaw means along said path comprises a compression spring.

8. Apparatus according to claim 1 wherein said holder means and said drive means are arranged to be displaced along a lineal path.

9. Apparatus according to claim 1 wherein said first and second workpieces interfit against a resistance force that is a function of displacement and wherein said driving means is arranged for producing a force of selected characteristic substantially equal to said resistance force function.

10. Apparatus for assembling first and second workpieces that interfit with selected relative displacement along a path, said apparatus comprising
    A. jaw means for removeably and replaceably holding said first workpiece in selected alignment and positioning along said path,
    B. drive means
       (i) removeably and replaceably engaging said second workpiece that is partially telescopically assembled with said first workpiece held by jaw means, and
       (ii) telescopically displacing said second workpiece relative to said first workpiece held by said jaw means with a force which is substantially constant over said selected displacement.

11. Apparatus according to claim 10 wherein said drive means comprises a compression spring arranged for producing said force.

12. Apparatus according to claim 10 further comprising a guide means arranged to mount said jaw means and said drive means for movement along a selected path of said selected displacement.

13. Apparatus according to claim 10 wherein said jaw means and said drive means are arranged to be displaced along a lineal path.

14. A method for assembling first and second workpieces that interfit with relative displacement along a path, said process comprising
    A. removeably and replaceably holding said first workpiece with selected alignment and position along said path,
    B. removeably and replaceably engaging said second workpiece that is partially telescopically assembled with said first workpiece, and
    C. displacing said second workpiece relative to said first workpiece with a force that is substantially constant over said selected displacement.

15. A method according to claim 14 further comprising the steps of
    A. seating an axially extending optical fiber within a continuous passage in said first and second workpieces, a first portion of said optical fiber extending from said second workpiece,
    B. providing a compressive system disposed within said passage of said first and second workpieces for substantially encircling a second portion of an optical fiber seated in said passage, said compressive system being radially inwardly deformable, and
    C. deforming said compressive system, using a force that is substantially constant over said selected displacement, radially inward into supporting and retaining engagement with said second portion of said optical fiber.

16. A method according to claim 14 further comprising the steps of
    A. cleaving the fiber optic cable extending beyond a forward face of said second workpiece, and
    B. polishing said optical fiber remaining after said cleaving step.

17. Apparatus for assembling a fiber optic connector having first and second workpieces that interfit, said apparatus comprising A. holder means for removeably and replaceably holding the first workpiece in a selected position along a path, the first workpiece having a central bore in which an optical fiber is supportingly seated extending along said path and said first work piece being arranged to securely hold the optical fiber upon selected telescopic assembly within the second workpiece, said holder means holding the first workpiece oriented to telescopically engage with the second workpiece, B. drive means for removeably and replaceably engaging the second workpiece that is partially telescopically assembled with the first workpiece held in said holder means, and for displacing the partially telescopically assembled second workpiece along said path relative to the first workpiece held in said holder means for further telescopical interfitting assembly of the two workpieces, for thereby securely holding the optical fiber in the first workpiece central bore, and C. means for maintaining said holder means and said driving means in selected disposition relative to said path during said relative displacement of the work pieces.

18. Apparatus according to claim 17 wherein said drive means includes a resiliently acting element arranged for providing a force of selected characteristic for said relative displacement of the workpieces.

19. Apparatus according to claim 17 wherein

A. said holder means includes jaw means for removeably and replaceably holding the first workpiece in said selected position and orientation, and B. wherein said drive means includes means for displacing the partially telescopically assembled second workpiece relative to the first workpiece held by said jaw means with a force that is substantially constant over said telescopic displacement.

20. Apparatus according to claim 19 wherein said drive means comprises a compression spring arranged for producing said substantially constant force.

* * * * *

UNITED STATES PATENT AND TRADEMARK OFFICE
CERTIFICATE OF CORRECTION

PATENT NO. : 5,102,211
DATED : April 7, 1992
INVENTOR(S) : Paul Slaney and Soren Grinderslev It is certified that error appears in the above-identified patent and that said Letters Patent is hereby corrected as shown below:

On the title page, Item [75]: change inventor: "Grindersley" to --Grinderslev--.

Column 3, line 61, between "shown" and "unassembled", insert ---in--.

Column 3, line 65, between "of" and "termination", insert --the--.

Column 10, line 66, change "Projecting" to --projecting--.

Signed and Sealed this

Twenty-first Day of September, 1993

Attest:

Attesting Officer

BRUCE LEHMAN

Commissioner of Patents and Trademarks